E. A. NELSON.
MOTOR VEHICLE FRAME AND BODY CONSTRUCTION.
APPLICATION FILED FEB. 14, 1912.
1,143,987.   Patented June 22, 1915.
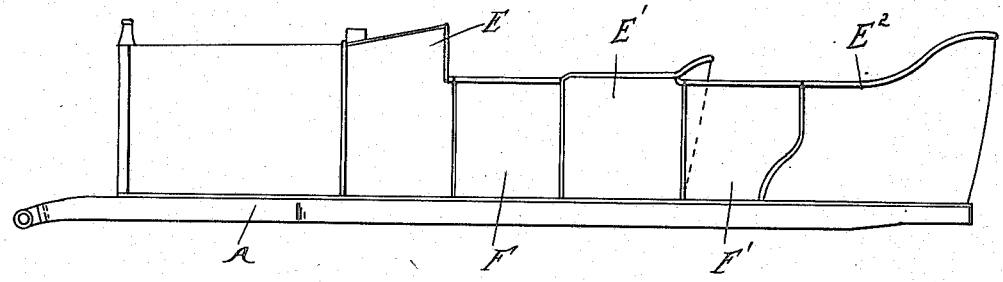
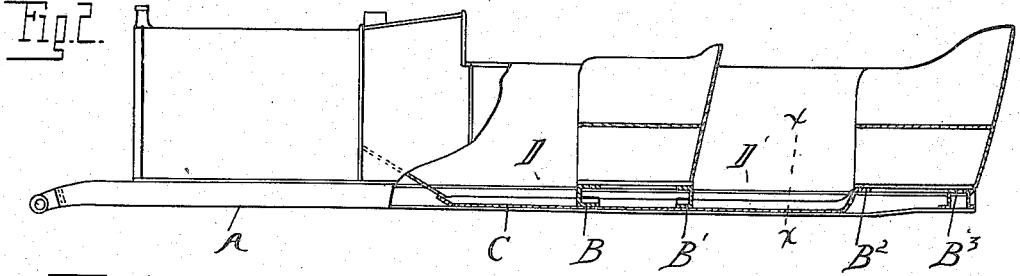
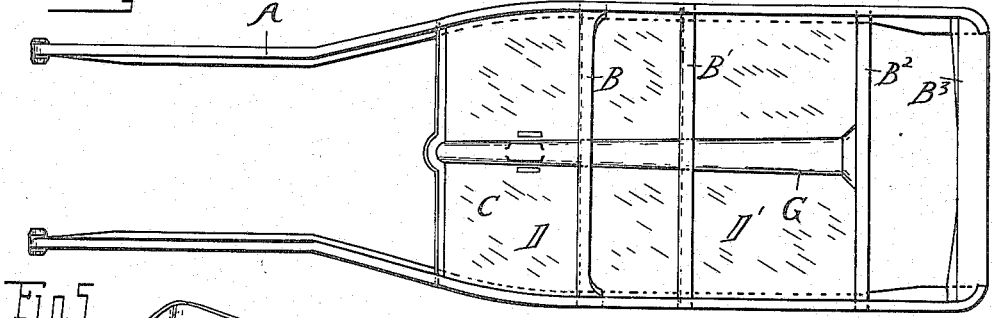
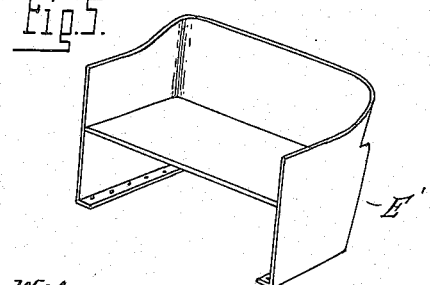
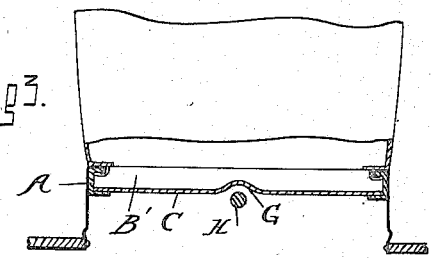
Witnesses
Inventor
Emil A. Nelson

UNITED STATES PATENT OFFICE.

EMIL A. NELSON, OF DETROIT, MICHIGAN, ASSIGNOR TO HUPP MOTOR CAR COMPANY, OF DETROIT, MICHIGAN, A CORPORATION OF MICHIGAN.

MOTOR-VEHICLE FRAME AND BODY CONSTRUCTION.

1,143,987.      Specification of Letters Patent.      Patented June 22, 1915.

Application filed February 14, 1912. Serial No. 677,598.

*To all whom it may concern:*

Be it known that I, EMIL A. NELSON, a citizen of the United States of America, residing at Detroit, in the county of Wayne and State of Michigan, have invented certain new and useful Improvements in Motor-Vehicle Frame and Body Constructions, of which the following is a specification, reference being had therein to the accompanying drawings.

The invention relates to motor vehicles and has for its object the simplification and cheapening of the construction and also the reduction in height.

In the present state of the art, automobile bodies of the type commonly known as the torpedo body is extensively used, the characteristic feature being the closing of the sides between the seats and between the forward seat and the hood, by doors. The body is also formed of a single unit and as such is attached or detached from the chassis or vehicle frame above which it is mounted.

The present invention differs from the type above described in that the body is formed of a plurality of units, each unit being independently attached to the chassis.

A further feature is the formation of the floor or foot-board for each seat by a sheet metal plate or pan permanently attached to the chassis frame and arranged in the plane of the bottom of the sills. Thus the height of the body may be reduced to the extent that the foot-board is lowered with the result that such a body with an over slung running gear may be made as low or lower than a body of the usual type mounted on an underslung gear.

The invention consists in the features of construction described and as hereinafter set forth.

In the drawings,—Figure 1 is a side elevation of the body; Fig. 2 is a longitudinal section therethrough; Fig. 3 is a cross section on line $x$—$x$ Fig. 2; Fig. 4 is a plan view of the chassis frame with the body units removed; Fig. 5 is a perspective view of one of the body units.

A are the side sills of the chassis frame which may be of any suitable construction and of the desired contour in plan and elevation. These side sills are cross connected by a plurality of cross bars which as shown, consist of the bars B, B', B² and B³.

C is a plate of sheet metal extending between the side sills A and arranged substantially in the plane of the lower flanges thereof. As specifically shown, the side sills A are formed of channel bars with the lower flanges of the channel of greater width than the upper flanges thereof and the plate C resting upon said lower flanges and secured thereto. Thus the plane of the plate is substantially that of the bottom of the sills. The cross bars B, B', etc., are so arranged as to leave spaces D and D' in front of each seat in which the plate or pan C forms the floor or foot-board. These cross sills also are arranged in pairs for supporting each seat unit, the bars B and B' forming the supports for the forward seat, and the bars B² and B³ those for the rear seat.

E, E' and E² are the several units forming the body, the member E constituting the hood or shield in front of the forward seat and in rear of the engine hood, and the members E' and E² constituting respectively the forward and rear seats. Each of these members is independently secured to the chassis frame by suitable means such as bolts, and the spaces between units are filled by fore and rear doors F and F'. Thus when the several units are mounted in position, the appearance is produced of a single unit of the torpedo type.

The lowering of the floor or foot-board to the plane of the bottom of the sills would diminish the clearance space for the drive mechanism of the vehicle and I therefore avoid this result by embossing or striking up the member C to provide clearance for the transmission shaft. As shown, G is the struck-up portion which extends longitudinally and centrally of the member C and tapers from its rear to its forward end. This will provide a progressively increasing clearance for the transmission shaft such as H without objectionable interference with the space for the feet in front of each seat.

It will be observed that the plate C not only forms the floor or foot-board for the body but also is a structural element of the frame which stiffens and strengthens the latter.

What I claim as my invention is:

1. In a motor vehicle, the combination with a chassis frame having flanged side sills, of a body unit mounted on said frame, and a floor or foot-board extending substantially the length of said chassis and permanently attached to the lower flanges of said frame and forming a structural element thereof.

2. In a motor vehicle, the combination with a chassis frame comprising side sills provided with lower flanges and cross bars, of a seat unit mounted on said frame above the cross bars thereof, and a sheet metal plate arranged on said lower flanges of said side sills and spanning the space between said side sills in front of said seat, said plate forming a structural element of said chassis frame.

3. In a motor vehicle, the combination with a chassis frame composed of side sills provided with lower flanges and cross bars, of a metal plate arranged on said lower flanges of said side sills and forming a bottom or floor, and a body formed of a plurality of units separately attached to said frame with the space in front of each seat thereof spanned by said bottom or foot-board.

4. In a motor vehicle, a chassis frame comprising side sills, cross bars, a plate secured to the bottom of said side sills and a seat separate from said plate mounted on said frame above the cross bar.

5. In a motor vehicle, a chassis frame comprising side sills and cross bars formed of channel members, a plate arranged between the bottom flanges of said sills and cross bars and secured to said sills, and a seat mounted on said sills and cross bars.

6. In a motor vehicle, a chassis frame comprising side sills provided with flanges and cross bars, a plurality of seat sections separately mounted on said frame, and a sheet metal plate supported on the lower flanges of said sills and forming a common bottom or foot-board for said seats.

7. In a motor vehicle, a chassis frame comprising side sills, cross bars and a plate spanning the spaces between said sills and cross bars and extending substantially the length of said chassis frame, constituting a foot-board or floor for the vehicle body, a portion of said plate being struck-up or embossed to provide clearance for mechanism beneath the frame.

8. In a motor vehicle, a chassis frame comprising side sills provided with flanges, and a plate arranged on the lower flanges of said sills and spanning the spaces therebetween and constituting a foot-board or floor for the vehicle body, said plate being provided with longitudinally extending central portion struck up to provide clearance for the transmission shaft.

In testimony whereof I affix my signature in presence of two witnesses.

EMIL A. NELSON.

Witnesses:
  FRANK E. WATTS,
  GRANVILLE C. ALDRICH.